Jan. 5, 1943. A. A. SMITH 2,307,645
ASH TRAY
Filed Aug. 19, 1940
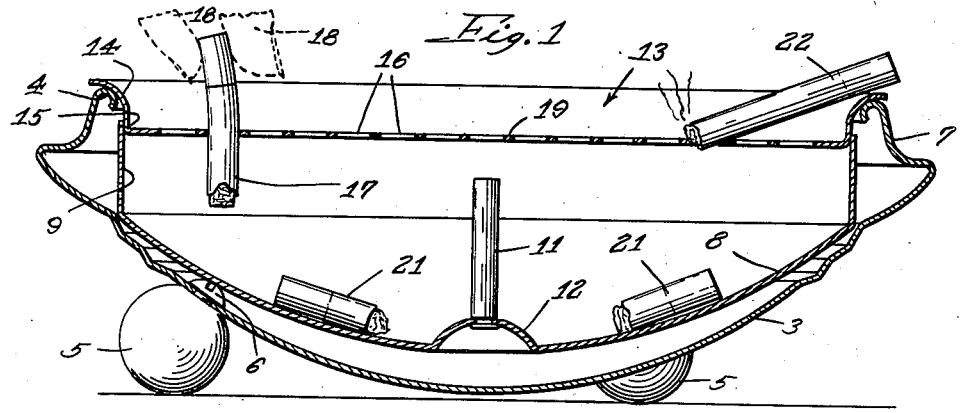
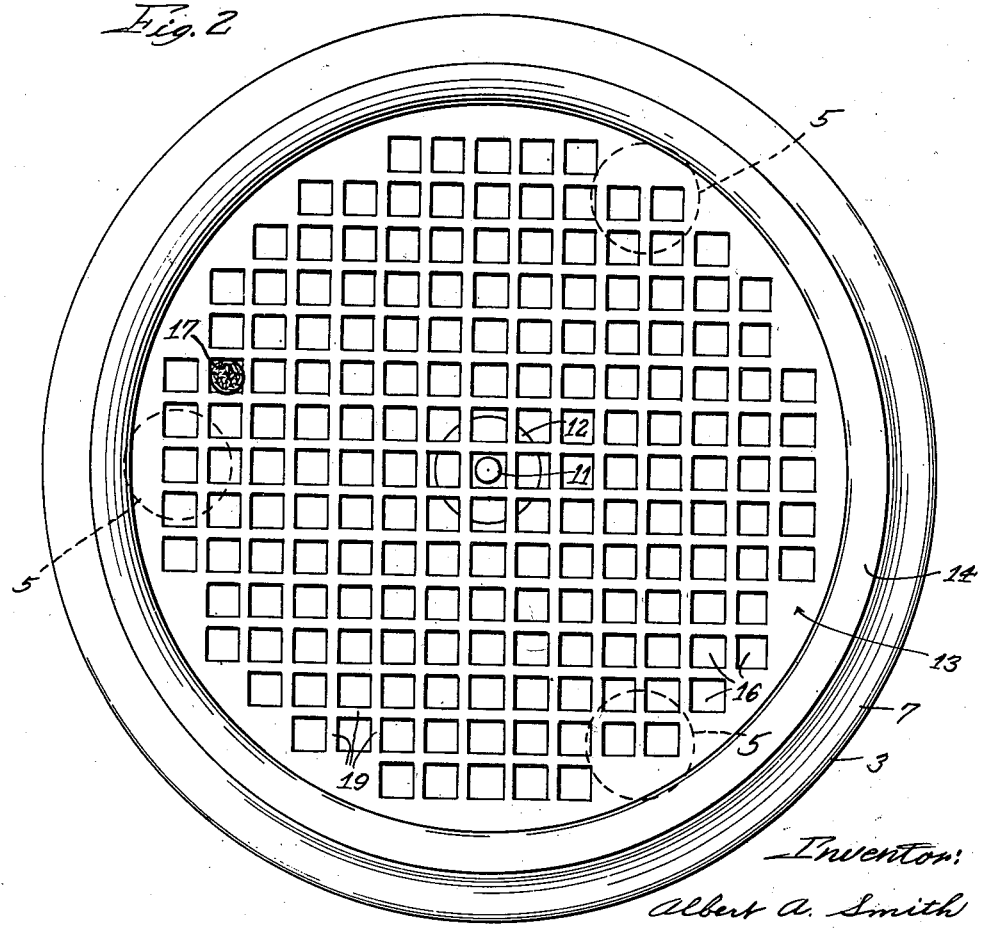
Inventor:
Albert A. Smith
By McCanna, Wintercorn
& Morsbach
Attys.

Patented Jan. 5, 1943

2,307,645

UNITED STATES PATENT OFFICE 2,307,645

ASH TRAY

Albert A. Smith, Goshen, Ind., assignor to Rockford Metal Specialty Company, Rockford, Ill., a corporation of Illinois Application August 19, 1940, Serial No. 353,192

2 Claims. (Cl. 131—242)

This invention relates to improvements in ash trays.

The principal object of my invention is to provide an ash tray of improved and increased utility, the salient feature of which is its novel grill member forming the top of the tray and having a multiplicity of medium sized openings of uniform shape and size through which the smoker may extinguish this cigarette or cigar by a light scratching or scraping of the burning end across the ribs of the grill that form narrow lands between the openings, the lands all being of uniform small width so that ashes won't collect thereon, and the openings on the other hand being just large enough to permit dropping the extinguished cigarettes through the openings into the tray, where the grill keeps the stubs more or less concealed from view. The invention, therefore, obviates the old inconvenient practice of extinguishing a cigarette by compressing and scraping it in the bottom of an ash tray besides avoiding the necessity of having unsightly stubs easily visible in the tray.

Another object of my invention is to provide a grill of the kind mentioned having uniform openings spaced so as to present an ornamental and pleasing appearance, the grill being furthermore preferably in the form of a one-piece sheet metal stamping for lightness, cheapness, and durability. The openings, in accordance with the present invention, are provided in a central depressed portion of the grill so that lighted cigarettes can conveniently be placed glowing end down on the perforated portion while the other end rests on the rim portion of the grill.

Still another object consists in providing an ash tray in which the grill forms a closure top for the receptacle and has substantially its entire area perforated to provide the openings and lands described, so that the ashes are not only concealed but are protected from direct air currents which might otherwise tend to blow the ashes around, it being a novel characteristic of the present grill to deflect air currents striking the same at an acute angle. The dead air in the space between the grill and the receptacle is also found to tend to extinguish burning stubs dropped therein, thereby eliminating the disagreeable stale odors so often present with other ash trays.

In the drawing:

Fig. 1 is a vertical section through an ash tray made in accordance with my invention and illustrating how the grill is adapted to support a burning cigarette or cigar and is also adapted to permit dropping cigarette stubs through the openings therein; and Fig. 2 is a top view of the ash tray showing the uniformly spaced openings in the grill and the ornamental pattern formed thereby.

The same reference numerals are applied to corresponding parts in these views.

A circular dished base 3 having an inwardly curled top rim 4 has a tripod support provided by ball feet 5 which are secured to the base by screws 6. This metallic base when suitably plated or finished along its upper rim portion 7, or all over, presents a neat and attractive appearance.

A circular dish 8 of stamped sheet metal having an integral vertical peripheral rim 9 is of small enough diameter to fit freely in the base 3, resting therein upon the heads of the screws 6. A peg 11 is riveted at its lower end to an upwardly bumped portion 12 at the center of the dish 8, providing a handle by means of which the dish 8 may be removed for dumping of ashes without handling the base 3.

A circular, one piece, sheet metal grill 13 rests on the rim 4 of the base 3 within the rim 9 of the dish 8. The grill has an integral, upwardly extending, outwardly curved peripheral flange 14 which seats upon the rim 4 of the base. The substantially 90° annular shoulder 15 formed on the grill 13 and defined by the flange 14 serves to position the grill 13 in register with the dish 8, by telescoping engagement in the rim thereof as shown.

As shown in Fig. 2, the grill 13 has a plurality of square openings 16 of uniform size and spacing throughout substantially the entire area of the depressed central portion thereof arranged to present a symmetrical design that is neat and pleasing in appearance. The grill 13 may be quickly and inexpensively stamped from sheet metal by simple die operations, and when its surfaces are suitably plated or otherwise finished, the grill presents a very attractive appearance. The openings 16 in the grill 13 are just large enough for the free entry therein of a cigarette stub 17 endwise, permitting the stub to drop therethrough when released, the smoker's fingers being indicated in dotted lines at 18.

Rigid webs or ribs 19 which define the square openings 16 therebetween are of such small width that the lands thereon will not support any substantial amount of ashes, although the ribs are wide enough to make the grill sufficiently strong and stiff to provide the desired cigarette scratching or scraping surface. While the drawing only discloses a grill 13 having square openings 16, my invention is not limited to such a grill design. For example, the objects of my invention are attainable with grill openings of equilateral triangular form, or hexagonal, or circular, or diamond form, or any other equivalent form, provided they permit the free passage of a cigarette therethrough and/or are so spaced and arranged that the webs or ribs therebetween form a web pattern that gives a rigid scratching surface for extinguishing a cigarette, the perforating being to such a high degree that the lands between perforations will not support any appreciable quantity of ashes.

It is evident that the ash tray of my invention adds a great deal to a smoker's convenience. Not only may accumulated ashes be dropped from the burning end of a cigarette by lightly drawing it across the lands 19 between several openings 16 of the grill 13, but the cigarette may be completely extinguished by a slight increase in pressure as it is drawn across a substantial portion of the perforated section of the grill, after which it may be dropped through a grill opening 16 into the dish 8. The butts or stubs indicated at 21 are not at all easily visible through the grill, so that the ash tray does not present a messy and littered appearance.

When the dish 8 contains a quantity of ashes and stubs 21, it can be removed and emptied after removing the grill 13, the peg 11 permitting easy handling of the dish 8, although the peg is relatively concealed when the grill 13 is in place. As shown in Fig. 1, a lighted cigarette 22 may be rested on the ash tray, supported at one end on the top of the flange 14 and at the lighted end on or between the lands 18 in such a manner that it is not apt to roll off, and will not become wet through collection of moisture on the paper, as commonly occurs when a cigarette is supported on a flat imperforate surface.

It is believed the foregoing description conveys a good understanding of the objects and advantages of my invention. The appended claims have been drawn to cover all legitimate modifications and adaptations.

I claim:
1. In an ash tray, the combination of an open-top base having its open upper end defined by a circular upstanding wall, a removable open-top ash receptacle disposed within said base having its open upper end defined by a substantially vertical, circular, upstanding wall of slightly smaller diameter than the aforesaid upstanding wall of said base, and a removable cover for said base, said cover comprising a perforated body portion surrounded by an upstanding flange of slightly smaller diameter than the upstanding circular wall of said ash receptacle and adapted to fit within the latter to locate said receptacle in the base in substantially central relationship thereto, the upstanding flange of said cover being flared outwardly to rest on top of the upstanding wall of the base and constituting a support in elevated relation to the perforated body portion of said cover, whereon to rest the unlighted ends of cigars and cigarettes while their lighted ends are resting in openings in the perforated portion of the cover.

2. In an ash tray, the combination of an open-top base having its open upper end defined by a circular upstanding wall, a removable open-top ash receptacle disposed within said base having its open upper end defined by a substantially vertical, circular, upstanding wall of smaller diameter than the aforesaid upstanding wall of said base, and a removable cover for said base, said cover comprising a perforated body portion surrounded by an upstanding flange flared outwardly to rest on top of the upstanding wall of the base and constituting a support in elevated relation to the perforated body portion of said cover, whereon to rest the unlighted ends of cigars and cigarettes while their lighted ends are resting in openings in the perforated portion of the cover, the lower portion of said cover being adapted to engage the upper edge portion of the circular upstanding wall on the ash receptacle to confine and position the latter between the base and cover in substantially central relationship to the circular upstanding wall of said base.

ALBERT A. SMITH.